Patented Apr. 26, 1938

2,115,020

UNITED STATES PATENT OFFICE 2,115,020

LACQUER ENAMEL

Richard Karl Hazen, Montclair, N. J., assignor to Egyptian Lacquer Manufacturing Company, a corporation of New Jersey No Drawing. Application August 12, 1936, Serial No. 95,634

5 Claims. (Cl. 134—79)

This invention relates to lacquer enamels and particularly to lacquer enamels containing nitrostarch. More specifically the invention contemplates nitrostarch lacquer enamels that may be applied by spraying and that will dry to form a serviceable usable film when exposed to air at atmospheric temperature for a relatively short time.

It is convenient to apply enamels by spraying, but in order to do so, the viscosity of the enamel must be comparatively low, say from 60 to 110 centipoises. In the heretofore customary art it has been impossible to produce a lacquer enamel of spraying viscosity which would contain more than about 17% to 20% of non-volatile constituents. Lacquer enamels containing such a low proportion of non-volatile constituents tend toward high enameling costs. The lower the non-volatile content in the lacquer enamel, the higher is its content of solvent or solvent mixture. The solvent or solvent mixture is seldom if ever recovered and is lost by evaporation into the atmosphere. Consequently, the lower the proportion of non-volatile constituents in the lacquer enamel, the greater is the loss of solvent or solvent mixture in forming a dry film of given thickness or weight. Moreover, a lacquer enamel containing only 17% to 20% of non-volatile ingredients ordinarily will not form a film of sufficient thickness from one spray coat. Two or more spray applications usually are required to form a film of suitable thickness when such an enamel is employed. Additional spray applications increase enameling costs by increasing labor and solvent loss, by requiring additional storage space for drying the enameled articles between spray applications and by increasing the amount of capital invested in material in process of manufacture.

As a result of my investigations I have succeeded in producing fast-drying lacquer enamels of spraying viscosity which contain at least 30% by weight of non-volatile ingredients or about double the proportion of non-volatile ingredients in the lacquer enamels of spraying viscosity in the heretofore customary art. Moreover, the lacquer enamels of my invention dry quickly under ordinary atmospheric conditions to form adherent smooth films.

When the improved lacquer enamels of my invention contain a solvent mixture and non-volatile ingredients including a pigment, nitrostarch and a resin with or without softeners and plasticizers, the amount of nitrostarch in the lacquer enamel ranges from 40 to 55% by weight of the non-volatile ingredients present, and the sum of the softeners, resins and plasticizers present is from 70 to 100% of the weight of the nitrostarch. Without exceeding spraying viscosity lacquer enamels of this character may be made containing at least 35% of non-volatile ingredients, and in most instances will contain as high as 50% by weight of non-volatile matter without exceeding spraying viscosity, say 60 to 110 centipoises at 25° C.

However, I have found that it is also possible to produce satisfactory nitrostarch lacquer enamels which will dry rapidly in air at room temperature and which contain pigment, nitrostarch, and plasticizer or softener, or both, but without substantial amounts of resin. When the resin content of nitrostarch enamels capable of air drying is either very low or absent, the nitrostarch content of the lacquer enamel should range from 55 to 65% by weight of the non-volatile ingredients and the sum of plasticizer and softener present should be from 30 to 40% by weight of the nitrostarch. A lacquer enamel of this character should not contain more than about 35% by weight of non-volatile ingredients (and preferably between 30 and 35%) if it is to be applied by spraying.

Throughout the specification and the appended claims I use the term "non-volatile ingredient" to describe those constituents of the lacquer enamel such as pigments, nitrostarch, plasticizers, softeners and resins which remain after the solvent or solvent mixture has evaporated at temperatures not to exceed about 70° C., and form the dried film.

The term "solvent" is used here to mean a readily volatile liquid which will dissolve nitrostarch or a resin, or both, and which will evaporate from a lacquer enamel film at room temperature, leaving the non-volatile ingredients in the form of a continuous uniform film.

The term "solvent mixture" is used to include true solvents for nitrostarch or for a resin or for both, with or without liquid diluents and latent solvents which by themselves will not dissolve nitrostarch or a resin, but when added in limited amount to a solution of nitrostarch or of resin or of both will dilute the solution without causing precipitation of the nitrostarch or the resin.

I use the term "plasticizer" to describe those ingredients in enamels or lacquer enamels which are true solvents for nitrostarch and which are added to impart flexibility and overcome brittleness in the final dried film. The plasticizer remains in the dried film but does not itself have film forming characteristics. Examples of such plasticizers are dibutyl phthalate, tricresyl phosphate and triacetin. As used here the term "plasticizer" does not include such substances as castor oil and blown Chinawood oil, which remain in dried films, imparting flexibility thereto and overcoming brittleness therein, but which are not true solvents for nitrostarch. Such substances are classified herein as "softeners".

The term "resin" as used here, defines those amorphous substances, both natural and artificial, which have inherent film forming characteristics and are exemplified by dammar gum, copal, ester gum, oil-acid modified alkyd resins, shellac, hydrogenated or unhydrogenated alkyl or aralkyl esters of abietic acid, unmodified phenol formaldehyde, and the like.

The nitrostarch employed preferably should contain about 13.2% nitrogen. Nitrostarch of this character has a low viscosity characteristic and is particularly suitable in lacquer enamels, i. e. in coating compositions which contain pigments and which form a dry film due to evaporation of a volatile ingredient instead of by chemical action such as the oxidation which causes film formation in the case of paints, etc.

I have found that there are certain ingredients and certain amounts and proportions of these ingredients which must be maintained in order to manufacture satisfactory quick-drying nitrostarch lacquer enamels. The amounts and proportions of the ingredients and in some cases the nature of the ingredients, are entirely different from those which assure satisfactory character of clear nitrostarch lacquers, such as furniture lacquers, described in the co-pending application Serial No. 87,329, filed June 26, 1936, by Arthur H. White, and are also entirely different from those which result in satisfactory "baking" lacquer enamels such as those described in my co-pending application Serial No. 95,635 filed August 12, 1936.

Thus I have found that in the manufacture of a quick-drying lacquer enamel containing both nitrostarch and a resin with or without a plasticizer or a softener or both, of the total non-volatile ingredients in the enamel from 40 to 55% should be nitrostarch. Moreover, the combined weight of the resin, the plasticizer and the softener in the enamel should be from 70 to 100% of the weight of the nitrostarch present.

If a black pigment is incorporated into the enamel it is preferable that its amount be from 6 to 12% by weight of the total non-volatile ingredients in the enamel. Moreover, if a black pigment is employed, the nitrostarch present should preferably amount to from 50 to 55% of the weight of the non-volatile ingredients and the combined weight of resin, plasticizer and softener present should be about three-quarters of the weight of the nitrostarch. When black pigments are employed in the practice of my invention, and the foregoing instructions are followed an enamel capable of drying to a mat or dull film will be formed. The film is hard and will acquire a high degree of lustre when rubbed.

If a pigment other than a black pigment is used, its amount should range from about 12% to about 26% of the weight of the non-volatile ingredients present. In such case, nitrostarch preferably should be employed in amounts ranging from 40 to 50% by weight of the non-volatile ingredients, and the combined weight of the resin, plasticizer and softener should range from about 70% to about 100% by weight of the nitrostarch. Enamels made in accordance with these principles dry in the atmosphere to form adherent "semi-glossy" films which acquire high lustre after gentle rubbing.

Ordinarily the presence of a plasticizer or a softener in the enamels of my invention is desirable. If, however, an enamel which will dry to form a film of high gloss without rubbing is desired, plasticizers and softeners may be omitted. Under these conditions, however, the resin employed should have a softening point ranging from 40° C. to 70° C. as determined by the ring and ball method given in detail by Henry A. Gardner in "Physical and Chemical Examination of Paints, Varnishes, Lacquers and Colors," fifth edition, pages 501 to 504.

Briefly, this ball and ring test is conducted as follows:

The resin or the like to be tested is melted and poured in to a brass ring laid on a plate. The ring should be poured full and the excess resin cut off the top ring surface after the resin has cooled. The filled ring is taken as the sample. The ring should have an inside diameter at the bottom of $\frac{5}{8}$ inch, an inside diameter at the top of $\frac{11}{16}$ inch, and a depth of $\frac{1}{4}$ inch. After the sample has been prepared, it is placed in a horizontal position in a bath of liquid which has a temperature considerably below the softening point of the sample. The ring should be supported so that the slug of resin inside it can fall out when it becomes loose. A $\frac{3}{8}$" ball, such as a steel ball bearing weighing about 3.5 grams, is placed on top of the resin in the ring and the temperature of the bath is thereafter raised uniformly at a rate of about 5° C. per minute. A thermometer is placed in the bath. The softening point is taken as the temperature of the bath at the moment when the resin sample frees itself from the ring and falls to the bottom of the bath.

In the manufacture of high gloss nitrostarch enamels containing resin but substantially no plasticizer or softener the nitrostarch content should range between 40 and 50% of the weight of the non-volatile ingredients and the resin content should range from 70 to 100% by weight of the nitrostarch. Preferably the resin content should be about 80% of the weight of the nitrostarch.

It is also possible to make a satisfactory nitrostarch "semi-gloss" lacquer enamel containing resin without substantial amounts of softener or plasticizer. As in the case of the high gloss lacquer enamel, the nitrostarch content should amount to from 40 to 50% by weight of the non-volatile ingredients, and the resin content should range from 70 to 100% by weight of the nitrostarch. Preferably the resin content should be about 90% of the weight of the nitrostarch. Examples of suitable resins are hydrogenated or unhydrogenated alkyl or aralkyl esters of abietic acid.

Lastly, it is possible to produce semi-glossy nitrostarch enamels which contain a plasticizer or a softener or both, without substantial quantities of a resin. In such case, however, it is necessary to employ other proportions of ingredients. Thus the nitrostarch content should range from 55 to 65% by weight of the non-volatile ingredients, and the combined weight of the plasticizers and softeners employed should range from 30 to 40% by weight of the nitrostarch. An enamel thus formulated, while satisfactory for many purposes, is not as satisfactory as one containing substantial amounts of resin.

I have made extensive investigations of quick-drying nitrostarch lacquer enamels, employing a great variety of resins, plasticizers and softeners in conjunction with nitrostarch. These investigations indicate that such lacquer enamels do not have satisfactory qualities if their respective formulae depart substantially from the following ranges:

| | Nitrostarch, percent by weight of total nonvolatile ingredients | Sum of resins, plasticizers and softeners, percent by weight of nitrostarch |
|---|---|---|
| Lacquer enamels containing nitrostarch and substantial amounts of resin with or without a plasticizer or softener or both | 40 to 55 | 70 to 100 |
| | | Sum of plasticizers and softeners, percent by weight of nitrostarch |
| Lacquer enamels containing nitrostarch, plasticizer, or softener, or both, but little or no resin | 55 to 65 | 30 to 40 |

Outside of these ranges the product does not form a satisfactory film upon drying under atmospheric conditions. The film formed with lacquer enamels outside these ranges tends to be too brittle or too tacky, so that on the one hand films are formed which have poor adhesion and which tend to check and peel, and on the other hand films are formed which do not become usable in a reasonable time, if ever.

Within the ranges specified, however, satisfactory films may be formed by applying the lacquer enamel by spraying, and thereafter permitting the film to dry for a short period, say 15 to 30 minutes, even when the lacquer enamel which is sprayed contains as much as 30% by weight of non-volatile ingredients and in some cases when the sum of the non-volatile ingredients amounts to as much as 55% by weight of the lacquer enamel as it is sprayed.

My invention will be more thoroughly understood in the light of the following formulae, which are examples of enamels made in accordance with the above enunciated rules. In all the examples the non-volatile ingredients and the solvent mixture are set forth separately.

FORMULA I

Black enamel of mat finish

| Non-volatile ingredients | Percent by weight |
|---|---|
| Nitrostarch (13.2% nitrogen) | 52.8 |
| Softener—brown China-wood oil | 25.5 |
| Resin—ester gum | 14.7 |
| Pigment—carbon black | 7.0 |
| Total | 100.0 |

| | Range | Example |
|---|---|---|
| Ratio of nitrostarch content to combined softener and resin content | 100 to 70–100 | 100 to 76 |
| Ratio of total non-volatile content to pigment content | 100 to 6–12 | 100 to 7 |

| Solvent mixture | Percent by weight |
|---|---|
| Denatured ethyl alcohol | 7 |
| Ethyl acetate | 10 |
| Butyl alcohol | 10 |
| Butyl acetate | 30 |
| Toluol | 43 |
| Total | 100 |

| Composition of enamel, total non-volatile ingredient and total solvent mixture | Percent by weight |
|---|---|
| Non-volatile ingredient | 36.7 |
| Solvent mixture | 63.3 |
| Total | 100.0 |

In the above and the following examples the composition of the combined non-volatile ingredients and of the combined solvent mixture first are given separately. Then the respective proportions of the combined non-volatile ingredients and the combined solvent mixture which go to make up the final product are given.

No special equipment or procedure is necessary in preparing enamel according to the above formula or any of the following formulae. The nitrostarch and the resin are dissolved separately in suitable portions of the individual solvents or the solvent mixture. The pigment is dispersed in the softener, resin (or the plasticizer if one is employed) by any of the customary methods used at present in the lacquer enamel art, for instance by grinding in a pebble mill. The dispersed pigment, the resin solution and the nitrostarch solution are then combined, thinned with any remaining proportion of the solvent mixture, and thoroughly mixed.

An enamel prepared in accordance with Formula I had a viscosity of 75 centipoises at 25° C., formed a coat of adequate thickness in a single spray application, dried in the atmosphere at room temperature in 15 minutes into a firm film of dull lustre which adhered strongly to a steel sheet and which showed no signs of checking even after several weeks. The film was easily polished to a high degree of lustre by gentle rubbing.

The two formulae immediately following are examples of semi-glossy nitrostarch enamels of my invention containing a resin and at least one substance selected from the group consisting of plasticizers and softeners:

FORMULA II

Semi-glossy dark green enamel

| Composition of non-volatile ingredients | Percent by weight |
|---|---|
| Nitrostarch (13.2% nitrogen) | 43.2 |
| Resin—equal parts of ester gum and shellac | 15.6 |
| Softener—castor oil | 9.1 |
| Plasticizer—dibutyl phthalate | 7.0 |
| Pigment—chrome green dark | 25.1 |
| Total | 100.0 |

| | Range | Example |
|---|---|---|
| Ratio of nitrostarch content to combined resin, plasticizer and softener content | 100 to 70–100 | 100 to 73 |
| Ratio of total non-volatile content to pigment content | 100 to 12–26 | 100 to 25 |

| Composition of solvent mixture | Percent by weight |
|---|---|
| Denatured ethyl alcohol | 15 |
| Ethyl acetate | 5 |
| Butyl alcohol | 10 |
| Butyl acetate | 30 |
| Toluol | 40 |
| Total | 100 |

| Composition of enamel, total non-volatile ingredient and total solvent mixture | Percent by weight |
|---|---|
| Non-volatile ingredient | 48.7 |
| Solvent mixture | 51.3 |
| Total | 100.0 |

The enamel was prepared by dispersing the pigment in the mixed plasticizer and softener, dissolving the nitrostarch and the resin separately in suitable portions of the solvents therefore, combining the dispersed pigment with the nitrostarch and resin solutions, adding the balance of the solvent mixture and thoroughly mixing the lot.

The enamel had a viscosity of 75 centipoises at 25° C., was easily sprayed, formed a sufficiently thick coat in a single application, and dried in the atmosphere at room temperature in 15 minutes to form a desirable adherent film.

FORMULA III

Semi-glossy green enamel

| Composition of non-volatile ingredients | Percent by weight |
|---|---|
| Nitrostarch (13.2% nitrogen) | 46.0 |
| Plasticizer—dibutyl phthalate | 14.0 |
| Softener—blown Chinawood oil | 14.0 |
| Resin—equal parts of ester gum and shellac | 11.4 |
| Pigment—chrome green | 14.6 |
| Total | 100.0 |

| | Range | Example |
|---|---|---|
| Ratio of nitrostarch content to combined resin, plasticizer and softener contents | 100 to 70–100 | 100 to 86 |
| Ratio of total non-volatile content to pigment content | 100 to 12–25 | 100 to 15 |

| Composition of solvent mixture | Percent by weight |
|---|---|
| Denatured ethyl alcohol | 15 |
| Ethyl acetate | 5 |
| Butyl alcohol | 10 |
| Butyl acetate | 30 |
| Toluol | 40 |
| Total | 100 |

| Composition of enamel, total non-volatile ingredient and total solvent mixture | Percent by weight |
|---|---|
| Non-volatile ingredient | 44.0 |
| Solvent mixture | 56.0 |
| Total | 100.0 |

This enamel was prepared in the same manner as that of Formula II. It had a viscosity of 75 centipoises at 25° C. It formed a coat of adequate thickness in a single spray application and manifested extraordinary adhesion when applied to surfaces of nickel, copper, brass, tin, iron, chromium, cadmium and glass. The film was firm and did not check or show other defects even after several weeks of indoor aging.

The following formula represents a satisfactory high gloss nitrostarch enamel containing a large proportion of resin:

FORMULA IV

High gloss green enamel

| Composition of non-volatile ingredients | Percent by weight |
|---|---|
| Nitrostarch (13.2% nitrogen) | 45.5 |
| Resin—unmodified phenol formaldehyde | 37.2 |
| Pigment—(chrome green) | 17.3 |
| Total | 100 |

| | Range | Example |
|---|---|---|
| Ratio of nitrostarch content to resin content | 100 to 70–100 | 100 to 82 |
| Ratio of total non-volatile content to pigment content | 100 to 12–26 | 100 to 17 |

| Composition of solvent mixture | Percent by weight |
|---|---|
| Denatured ethyl alcohol | 7 |
| Ethyl acetate | 5 |
| Butyl alcohol | 10 |
| Butyl acetate | 25 |
| Toluol | 53 |
| Total | 100 |

| Composition of enamel, total non-volatile ingredients and total solvent mixture | Percent by weight |
|---|---|
| Non-volatile ingredients | 47 |
| Solvent mixture | 53 |
| Total | 100 |

This enamel had a viscosity of 75 centipoises at 25° C. It sprayed well, forming a thick, and desirable coat in a single application. It set to a desirable firm and lustrous film in ½ hour.

The formula immediately following represents a satisfactory, semi-glossy nitrostarch enamel containing substantially no plasticizer or softener:

FORMULA V

*Semi-gloss green enamel*

| Composition of non-volatile ingredient | Percent by weight |
|---|---|
| Nitrostarch (13/2% nitrogen) | 45.6 |
| Resin—hydrogenated or unhydrogenated alkyl or aralkyl esters of abietic acid, "Hercolyn" | 40.0 |
| Pigment—chrome green | 14.4 |
| Total | 100.0 |

| Ratio of nitrostarch content to resin content | Range | Example |
|---|---|---|
| | 100 to 70–100 | 100 to 88 |
| Ratio of total non-volatile content to pigment content | 100 to 30–40 | 100 to 14 |

| Composition of solvent mixture | Percent by weight |
|---|---|
| Denatured ethyl alcohol | 8 |
| Ethyl acetate | 10 |
| Butyl alcohol | 10 |
| Butyl acetate | 30 |
| Toluol | 32 |
| Hydrogenated petroleum derivative "Solvess #1" | 10 |
| Total | 100 |

| Composition of enamel, total non-volatile ingredient and total solvent mixture | Percent by weight |
|---|---|
| Non-volatile ingredient | 46.9 |
| Solvent mixture | 53.1 |
| Total | 100.0 |

The viscosity of this enamel was 75 centipoises at 25° C. It formed a satisfactory coat with a single spray application.

Formula VI, which follows, exemplifies a suitable composition of a semi-glossy nitrostarch enamel containing substantially no resin.

FORMULA VI

| Composition of non-volatile ingredient | Percent by weight |
|---|---|
| Nitrostarch (13.2% nitrogen) | 59 |
| Plasticizer—dibutyl phthalate | 20.5 |
| Pigment—iron oxide | 20.5 |
| Total | 100.0 |

| Ratio of nitrostarch content to combined softener and plasticizer content | Range | Example |
|---|---|---|
| | 100 to 30–40 | 100 to 35 |
| Ratio of total non-volatile content to pigment content | 100 to 12–26 | 100 to 20 |

| Composition of solvent mixture | Percent by weight |
|---|---|
| Denatured ethyl alcohol | 7 |
| Ethyl acetate | 5 |
| Butyl alcohol | 5 |
| Butyl acetate | 45 |
| Toluol | 38 |
| Total | 100 |

| Composition of enamel, total non-volatile ingredient and total solvent mixture | Percent by weight |
|---|---|
| Non-volatile ingredient | 31.2 |
| Solvent mixture | 68.8 |
| Total | 100.0 |

Enamel prepared according to this formula had a viscosity of 15 centipoises at 25° C., sprayed easily, and formed a satisfactory coat in a single spray application.

The black lacquer enamels of my invention are most satisfactory for spray application when they contain about 35% of non-volatile ingredients.

The semi-gloss lacquer enamel which contains substantially no resin is most satisfactory for spray application when it contains between 30 and 35% by weight of non-volatile ingredients.

The semi-gloss and high gloss nitrostarch lacquer enamels that contain appreciable quantities of resin may be applied with a spray and yield highly satisfactory results even when they contain from 40 to 50% by weight of non-volatile ingredients.

I claim:

1. A lacquer enamel having a viscosity of 60 to 110 centipoises at 25° C. and capable of drying at atmospheric temperatures to form a durable film, said lacquer enamel containing a solvent mixture and non-volatile ingredients comprising a pigment, nitrostarch and resin, the amount of nitrostarch present being from 40 to 55% by weight of the non-volatile ingredients, the sum of resins, plasticizers and softeners present being from 70 to 110% by weight of the nitrostarch, and the weight of the non-volatile ingredients being from 30 to 55% of the total weight of the lacquer enamel.

2. A lacquer enamel of a color other than black having a viscosity of 60 to 110 centipoises at 25° C. and capable of drying at atmospheric temperatures to form a durable film, said lacquer enamel containing a solvent mixture and non-volatile ingredients comprising a pigment, nitrostarch and resin, the amount of nitrostarch present being from 40 to 50% by weight of the non-volatile ingredients, the sum of resins, plasticizers and solvents present being from 70 to 100% by weight of the nitrostarch, the weight of the pigment being from 12 to 26% by weight of the total lacquer enamel and the weight of the non-volatile ingredients being from 30 to 55% of the total weight of the lacquer enamel.

3. A black lacquer enamel capable of drying in air to form a durable matt film and having a viscosity of 60 to 110 centipoises at 25° C., said lacquer enamel containing a solvent mixture and non-volatile ingredients including a black pigment, nitrostarch and resin, the pigment being present in amount equal to 6 to 12% of the total weight of the lacquer enamel, the amount of nitrostarch present being from 50 to 55% of the weight of the non-volatile ingredients, the sum of resin, plasticizers and softeners present being from 70 to 110% by weight of the nitrostarch, and the non-volatile ingredients present being at least 30% by weight of the total lacquer enamel.

4. A lacquer enamel having a viscosity of 60 to 110 centipoises at 25° C. and capable of drying at atmospheric temperatures to form a durable film, said lacquer enamel containing a solvent mixture and non-volatile ingredients comprising a pigment, nitrostarch and resin having a softening point ranging from 40 to 70° C. as determined by the ball and ring method, the amount of nitrostarch present being from 40 to 55% by weight of the non-volatile ingredients, the sum of resin, plasticizers and softeners present being from 70 to 100% by weight of the nitrostarch, and the weight of the non-volatile ingredients being at least 30% of the total weight of the lacquer enamel.

5. A lacquer enamel having a viscosity of 60 to 110 centipoises and capable of drying at atmospheric temperatures to form a durable film, said lacquer enamel containing a solvent mixture and non-volatile ingredients comprising a pigment, nitrostarch having nitrogen content of about 13.2% and resin, the amount of nitrostarch present being from 40 to 55% by weight of the non-volatile ingredients, the sum of resin, plasticizers and softeners present being from 70 to 100% by weight of the nitrostarch and the weight of the non-volatile ingredients being at least 30% of the total weight of the lacquer enamel.

RICHARD KARL HAZEN.

---

CERTIFICATE OF CORRECTION.

Patent No. 2,115,020. April 26, 1938.

RICHARD KARL HAZEN.

It is hereby certified that error appears in the printed specification of the above numbered patent requiring correction as follows: Page 3, second column, line 7, Formula I, for the word "brown" read blown; and that the said Letters Patent should be read with this correction therein that the same may conform to the record of the case in the Patent Office.

Signed and sealed this 14th day of June, A. D. 1938.

(Seal)

Henry Van Arsdale,
Acting Commissioner of Patents.

nitrostarch and resin, the amount of nitrostarch present being from 40 to 50% by weight of the non-volatile ingredients, the sum of resins, plasticizers and solvents present being from 70 to 100% by weight of the nitrostarch, the weight of the pigment being from 12 to 26% by weight of the total lacquer enamel and the weight of the non-volatile ingredients being from 30 to 55% of the total weight of the lacquer enamel.

3. A black lacquer enamel capable of drying in air to form a durable matt film and having a viscosity of 60 to 110 centipoises at 25° C., said lacquer enamel containing a solvent mixture and non-volatile ingredients including a black pigment, nitrostarch and resin, the pigment being present in amount equal to 6 to 12% of the total weight of the lacquer enamel, the amount of nitrostarch present being from 50 to 55% of the weight of the non-volatile ingredients, the sum of resin, plasticizers and softeners present being from 70 to 110% by weight of the nitrostarch, and the non-volatile ingredients present being at least 30% by weight of the total lacquer enamel.

4. A lacquer enamel having a viscosity of 60 to 110 centipoises at 25° C. and capable of drying at atmospheric temperatures to form a durable film, said lacquer enamel containing a solvent mixture and non-volatile ingredients comprising a pigment, nitrostarch and resin having a softening point ranging from 40 to 70° C. as determined by the ball and ring method, the amount of nitrostarch present being from 40 to 55% by weight of the non-volatile ingredients, the sum of resin, plasticizers and softeners present being from 70 to 100% by weight of the nitrostarch, and the weight of the non-volatile ingredients being at least 30% of the total weight of the lacquer enamel.

5. A lacquer enamel having a viscosity of 60 to 110 centipoises and capable of drying at atmospheric temperatures to form a durable film, said lacquer enamel containing a solvent mixture and non-volatile ingredients comprising a pigment, nitrostarch having nitrogen content of about 13.2% and resin, the amount of nitrostarch present being from 40 to 55% by weight of the non-volatile ingredients, the sum of resin, plasticizers and softeners present being from 70 to 100% by weight of the nitrostarch and the weight of the non-volatile ingredients being at least 30% of the total weight of the lacquer enamel.

RICHARD KARL HAZEN.

CERTIFICATE OF CORRECTION.

Patent No. 2,115,020.                                                                April 26, 1938.

RICHARD KARL HAZEN.

It is hereby certified that error appears in the printed specification of the above numbered patent requiring correction as follows: Page 3, second column, line 7, Formula I, for the word "brown" read blown; and that the said Letters Patent should be read with this correction therein that the same may conform to the record of the case in the Patent Office.

Signed and sealed this 14th day of June, A. D. 1938.

(Seal)

Henry Van Arsdale,
Acting Commissioner of Patents.

CERTIFICATE OF CORRECTION.

Patent No. 2,115,020. April 26, 1938.

RICHARD KARL HAZEN.

It is hereby certified that error appears in the printed specification of the above numbered patent requiring correction as follows: Page 3, second column, line 7, Formula I, for the word "brown" read blown; and that the said Letters Patent should be read with this correction therein that the same may conform to the record of the case in the Patent Office.

Signed and sealed this 14th day of June, A. D. 1938.

(Seal)

Henry Van Arsdale,
Acting Commissioner of Patents.